United States Patent
Lee et al.

(10) Patent No.: US 9,305,193 B2
(45) Date of Patent: Apr. 5, 2016

(54) CONTACTLESS COMMUNICATION DEVICE AND USER DEVICE INCLUDING THE SAME

(71) Applicant: Samsung Electronics Co., Ltd., Suwon-si (KR)

(72) Inventors: Youngjoo Lee, Yongin-si (KR); Iljong Song, Suwon-si (KR); Cholsu Yoon, Yongin-si (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/183,900

(22) Filed: Feb. 19, 2014

(65) Prior Publication Data

US 2015/0178525 A1    Jun. 25, 2015

(30) Foreign Application Priority Data

Mar. 7, 2013  (KR) .................. 10-2013-0024625

(51) Int. Cl.
*G06K 7/10*    (2006.01)
(52) U.S. Cl.
CPC ........ *G06K 7/10237* (2013.01); *G06K 7/10158* (2013.01); *G06K 7/10217* (2013.01)

(58) Field of Classification Search
CPC .......... G06K 7/10237; G06K 7/10217; G06K 7/10158
See application file for complete search history.

(56) References Cited

U.S. PATENT DOCUMENTS

| | | | |
|---|---|---|---|
| 7,098,770 B2 | 8/2006 | Charrat et al. | |
| 7,665,664 B2 | 2/2010 | Charrat et al. | |
| 8,126,433 B2 | 2/2012 | Haartsen | |
| 8,451,122 B2 | 5/2013 | Narendra et al. | |
| 2008/0087723 A1* | 4/2008 | Kargl et al. ................... | 235/380 |
| 2012/0071089 A1 | 3/2012 | Charrat et al. | |

OTHER PUBLICATIONS

Cho et al., "Design of single-chip NFC transceiver."

* cited by examiner

*Primary Examiner* — Kristy A Haupt
(74) *Attorney, Agent, or Firm* — Muir Patent Law, PLLC

(57) ABSTRACT

A contactless communication device is provided which includes a field strength detecting circuit configured to detect a strength of a field induced on an antenna; a card circuit configured to demodulate a signal received via the antenna during a reception interval of a card mode; a processing unit configured to process the demodulated signal; and a reader circuit configured to transmit data via the antenna during a transmission interval of the card mode, the data provided from the processing unit, wherein an output power of the reader circuit is adjusted according to the field strength detected.

30 Claims, 8 Drawing Sheets

CONTACTLESS COMMUNICATION DEVICE AND USER DEVICE INCLUDING THE SAME

CROSS-REFERENCE TO RELATED APPLICATIONS

A claim for priority under 35 U.S.C. §119 is made to Korean Patent Application No. 10-2013-0024625 filed Mar. 7, 2013, in the Korean Intellectual Property Office, the entire contents of which are hereby incorporated by reference.

BACKGROUND

This disclosure relates to a communication device, and more particularly, to a contactless communication device.

In general, an RFID (Radio Frequency Identification) system may relate to one of the automatic recognition fields using radio waves. The RFID system may also be called a radio frequency recognition system configured to recognize pre-stored predetermined information wirelessly using radio waves such as ultra-short waves or long waves. The RFID system may receive information stored in a tag. The RFID system may recognize and analyze the received information, and may obtain inherent and circumstance information for a product (e.g., information relating to the physical properties of the product, and information relating to product identification or association, such as a product ID number, manufacturer name, etc.) where the tag is applied or incorporated.

The RFID system may use signals to be free from ambient environments such as snow, rain, dust and magnetic flux, for example. Furthermore, the recognition speed may be fast such that recognition is possible even in transit, and at a predetermined long distance. The RFID system may be provided with an intrinsic ID (identification) in the manufacturing process to substantially prevent itself from being fabricated or counterfeited.

An RFID system may include for example a reader, an antenna, a tag, etc. The antenna may perform an intermediation function between the tag and the reader. The reader may send a power and a signal to the tag using a signal of a predetermined frequency, so that the tag is activated. Further, a response from the tag may be received via the antenna.

An NFC (Near Field Communication) scheme belonging to a field of the RFID may use a frequency (e.g., 13.56 MHz) of a high frequency band and transmit data at a distance with low power. One type of NFC scheme is standardized in ISO/IEC 18092. The NFC scheme can perform a short distance radio communication using various frequency signals including 125, 135 and 900 kHz in addition to the 13.56 MHz.

An NFC device may have advantages such as communicating or being compatible with existing information devices including portable wireless terminals and notebook computers through exchanges of address books, game and MP3 files. Certain NFC technology using a predetermined frequency band is high in its security and is already in use for public transportation and mobile phone payment. The NFC technology may be utilized as a future information terminal capable of obtaining a variety of information by using a tag stored with predetermined information.

A mobile phone embedded with NFC chips is in an early distribution stage and the NFC technology is expected to be widely adopted in mobile terminals including portable wireless terminals. The portable terminals embedded with NFC chips may be generally mounted with an NFC antenna, and may communicate with an external reader via the NFC antenna.

SUMMARY

One exemplary embodiment includes a contactless communication device which comprises a field strength detecting circuit configured to detect a strength of a field induced on an antenna; a card circuit configured to demodulate a signal received via the antenna during a reception interval of a card mode; a processing unit configured to process the demodulated signal; and a reader circuit configured to transmit data via the antenna during a transmission interval of the card mode, the data provided from the processing unit. The device is configured to adjust an output power of the reader circuit according to the field strength detected.

In example embodiments, the transmitted data is responsive to the received signal.

In example embodiments, the device is configured to adjust an output power of the reader circuit according to the field strength detected before the transmission interval of the card mode, and to maintain the adjusted output power during the transmission interval of the card mode.

In example embodiments, an output power of the reader circuit is adjusted according to the field strength detected before the transmission interval of the card mode, and the adjusted output power is adjusted according to the field strength detected in the transmission interval of the card mode.

In example embodiments, an output power of the reader circuit is adjusted according to the field strength detected in the transmission interval of the card mode.

In example embodiments, the contactless communication device further comprises a clock recovery circuit configured to generate a clock signal based on a carrier of a field induced on the antenna.

In example embodiments, the clock recovery circuit is configured to perform a course tuning on a frequency of the clock signal during an operating interval of the processing unit and to perform a fine tuning on the frequency of the clock signal during the transmission interval of the card mode.

In example embodiments, the device is further configured to supply the clock signal to the reader circuit with the data during the transmission interval of the card mode and the reader circuit is configured to drive the antenna with the adjusted output power in response to the clock signal and the data.

In certain example embodiments, the card circuit does not provide a modulation function. In other example embodiments, the card circuit provides a modulation function and a demodulation function.

In example embodiments, the processing unit is configured to activate the modulation function of the card circuit when communication using the reader circuit has failed.

In another embodiment a user device comprises an NFC transceiver; and an antenna impedance matching network connected to the NFC transceiver. The NFC transceiver comprises a field strength detecting circuit configured to detect a strength of a field induced on the antenna impedance matching network; a first circuit powered by an external signal, the first circuit configured to demodulate a signal received via the antenna in a reception interval of a card mode; a processing unit configured to process the demodulated signal; and a second circuit powered by the user device, the second circuit configured to transmit data provided from the processing unit via the antenna in a transmission interval of the card mode. The user device is configured to adjust an output power of the second circuit being adjusted according to the field strength detected.

In example embodiments, the user device is configured to adjust the output power of the second circuit according to the field strength detected before the transmission interval of the card mode, and to maintain the adjusted output power in the transmission interval of the card mode.

In example embodiments, the user device is configured to adjust the output power of the second circuit according to the field strength detected before the transmission interval of the card mode, and to further adjust the adjusted output power according to the field strength detected during the transmission interval of the card mode.

In example embodiments, the user device is configured to adjust the output power of the reader circuit according to the field strength during the transmission interval of the card mode.

In example embodiments, the NFC transceiver further comprises a clock recovery circuit configured to generate a clock signal based on a carrier of a field induced on the antenna.

In example embodiments, the clock recovery circuit is configured to perform a course tuning on a frequency of the clock signal during an operating interval of the processing unit and perform a fine tuning on the frequency of the clock signal during the transmission interval of the card mode.

In example embodiments, the user device is further configured to supply the clock signal to the second circuit with the data during the transmission interval of the card mode and the second circuit is configured to drive the antenna with the adjusted output power in response to the clock signal and the data.

Another embodiment provides an operating method of a contactless communication device, which includes a reader circuit and a card circuit connected to an antenna impedance matching network. The operating method comprises detecting a strength of a field induced on an antenna; demodulating a signal received via the antenna; processing the demodulated signal; and modulating the processed signal, wherein the demodulating is performed via the card circuit, the modulating is performed via the reader circuit, and an output power of the reader circuit is adjusted according to the detected field strength.

In example embodiments, the operating method further comprises generating a clock signal based on a carrier of a field induced on the antenna, and using the clock signal for modulation of the processed signal. A coarse tuning of the clock signal is performed during a processing interval of the demodulated signal and a fine tuning of the clock signal is performed during a transmission interval of a card mode.

In example embodiments, an output power of the reader circuit is adjusted according to the field strength detected before the transmission interval of the card mode, and the adjusted output power is maintained in the transmission interval of the card mode or is adjusted according to the field strength detected in the transmission interval of the card mode.

In another exemplary embodiment, a near field communication device includes: a receiving circuit configured to receive and demodulate a first signal received at an antenna; and a transmitting circuit configured to modulate and transmit a second signal in response to the first signal. The near field communication device is configured to detect a field strength of the first signal, and to control an output power for the second signal based on the detected field strength.

The near field communication device may additionally include a processor configured to control the output power for the second signal.

In one embodiment, the near field communication device further includes at least a first output driver, wherein the processor is configured to control the output power of the first output driver based on the detected field strength.

The near field communication device may additionally include at least a second output driver, wherein the processor is configured to control the output power of the first output driver and the second output driver based on the detected field strength.

In one embodiment, the near field communication device is configured to: modulate load by alternatively driving first and second chip terminals respectively connected to the first and second output drivers.

The near field communication device may further include a processor configured to: activate the receiving circuit and deactivate the transmitting circuit during a reception interval; and activate the transmitting circuit and deactivate the receiving circuit during a transmission interval that follows the reception interval.

The processor may be further configured to adjust the output power for the reader circuit prior to the transmission interval.

In one embodiment, a method of performing near field communications includes: receiving and demodulating a first signal received at an antenna; detecting a strength of an RF field at the antenna; processing the demodulated signal; modulating the processed signal; and transmitting a second signal that reflects the modulated processed signal. An output power for the second signal is adjusted according to the detected field strength.

Demodulating the first signal may be performed by a card circuit; and modulating the first signal may be performed by a reader circuit.

In one embodiment, the method includes activating the card circuit and deactivating the reader circuit during a reception interval; and deactivating the card circuit and activating the reader circuit during a transmission interval that follows the reception interval.

In the disclosed embodiments, a signal received during a reception interval of a card mode may be demodulated via a card circuit, and a signal to be transmitted during a transmission interval of the card mode may be modulated via a reader circuit. Also, the strength of a signal to be transmitted during the transmission interval of the card mode may be adjusted according to the strength of an RF field detected by an RF field strength detecting circuit. Furthermore, a clock signal for modulation is generated using a carrier of an RF field induced, so that the burden of a clock recovery circuit is reduced and noise immunity is improved.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
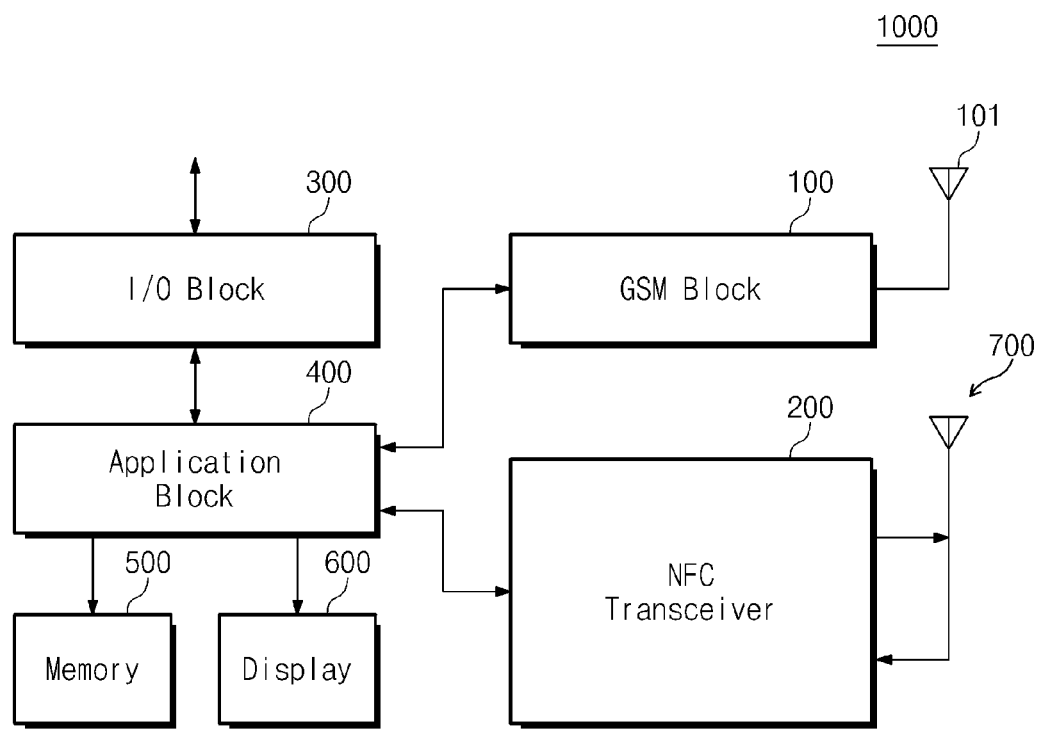
FIG. 1 is a block diagram of an example device in which several embodiments may be implemented.

Embodiments will be described in detail with reference to the accompanying drawings. The inventive concept, however, may be embodied in various different forms, and should not be construed as being limited only to the illustrated embodiments. Rather, these embodiments are provided as examples. Accordingly, known processes, elements, and techniques are not described with respect to some of the described embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section. Thus, a first element, component, region, layer or section discussed below could be termed a second element, component, region, layer or section without departing from the teachings of the disclosed embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device or parts thereof in use or operation in addition to the orientation depicted in the figures.

As used herein, the singular forms "a", "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram of an example device in which several embodiments may be implemented. A device illustrated in FIG. 1 may be, for example, a mobile phone as a user device. However, it is well understood that the inventive concept is not limited to the mobile phone.

Referring to FIG. 1, a mobile phone 1000 may include a Global System for Mobile Communication (GSM) block 100, a Near Field Communication (NFC) transceiver 200, an input/output (I/O) block 300, an application block 400, a memory 500, and a display 600. The components/blocks of the mobile phone 1000 in FIG. 1 are shown merely by way of illustration. However, the mobile phone 100 may contain more or fewer components/blocks. Further, although described as using GSM technology, the mobile phone 1000 may instead be implemented using other technologies such as CDMA (Code Division Multiple Access), for example. The blocks of FIG. 1 may be implemented in an integrated circuit (IC) form. Alternatively, some of the blocks may be implemented in an IC form, while other blocks may be in a discrete form.

The GSM block 100 may be connected to an antenna 101, and may operate to provide wireless telephone operations in a known way. The GSM block 100 may contain receiver and transmitter sections internally (not shown) to perform corresponding receive and transmit operations.

In one embodiment, the NFC transceiver 200 uses inductive coupling for wireless communication, and is configured to receive and transmit NFC signals. The NFC transceiver 200 may provide NFC signals, for example, to an antenna impedance matching network 700, and the antenna impedance matching network 700 may transmit NFC signals through inductive coupling. The antenna impedance matching network 700 may receive NFC signals (provided from another NFC device (not shown)), and may provide the received NFC signals to the NFC transceiver 200. The NFC transceiver 200 may communicate with an external device (e.g., a contactless communication device) using one of a reader mode and a card mode.

The NFC transceiver 200 may operate consistent with known specifications, such as described in Near Field Communication Interface and Protocol-1 (NFCIP-1) and Near Field Communication Interface and Protocol-2 (NFCIP-2) and standardized in ECMA-340, ISO/IEC 18092, ETSI TS 102 190, ISO 21481, ECMA 352, ETSI TS 102 312, etc.

The application block 400 may include corresponding hardware circuitry (e.g., one or more processors), and may operate, in one embodiment along with software, to provide various user applications provided by mobile phone 1000. The user applications may include, for example, voice call operations, data transfers, etc. The application block 400 may operate in conjunction with the GSM block 100 to provide such features.

The display 600 displays images in response to the corresponding display signals received from the application block 400. In one embodiment, for example, images are generated by a camera provided in mobile phone 100, but not shown in FIG. 1. The display 600 may include memory (e.g., a frame buffer) internally for temporary storage of pixel values for image refresh purposes, and may be implemented, for example, as a liquid crystal display screen with associated control circuits. The I/O block 300 may provide a user with the facility to provide inputs, for example, to dial numbers. In addition, the I/O block 300 may provide outputs that are received via the application block 400.

The memory 500 may store program (instructions) and/or data used by the applications block 400, and may be implemented as RAM, ROM, flash, etc. Thus, the memory 500 may contain volatile as well as non-volatile storage elements.

The antenna impedance matching network 700 may communicate with external devices by inductive coupling, and may be used for both transmission and reception of NFC signals. Transmission and reception of NFC signals by the NFC transceiver 200 may be performed, for example, in a time division multiplexed (TDM) manner. Accordingly, a time interval in which the NFC transceiver 200 transmits NFC signals may be termed a transmit interval, and the corresponding mode of operation of the NFC transceiver 200 may be viewed as a 'transmit mode' or "NFC reader transmit mode". Similarly, a time interval in which the NFC transceiver 200 receives NFC signals may be termed a receive interval, and the corresponding mode of operation of the NFC transceiver 200 may be viewed as a 'receive mode' or "NFC tag receive mode".

Figure 2:
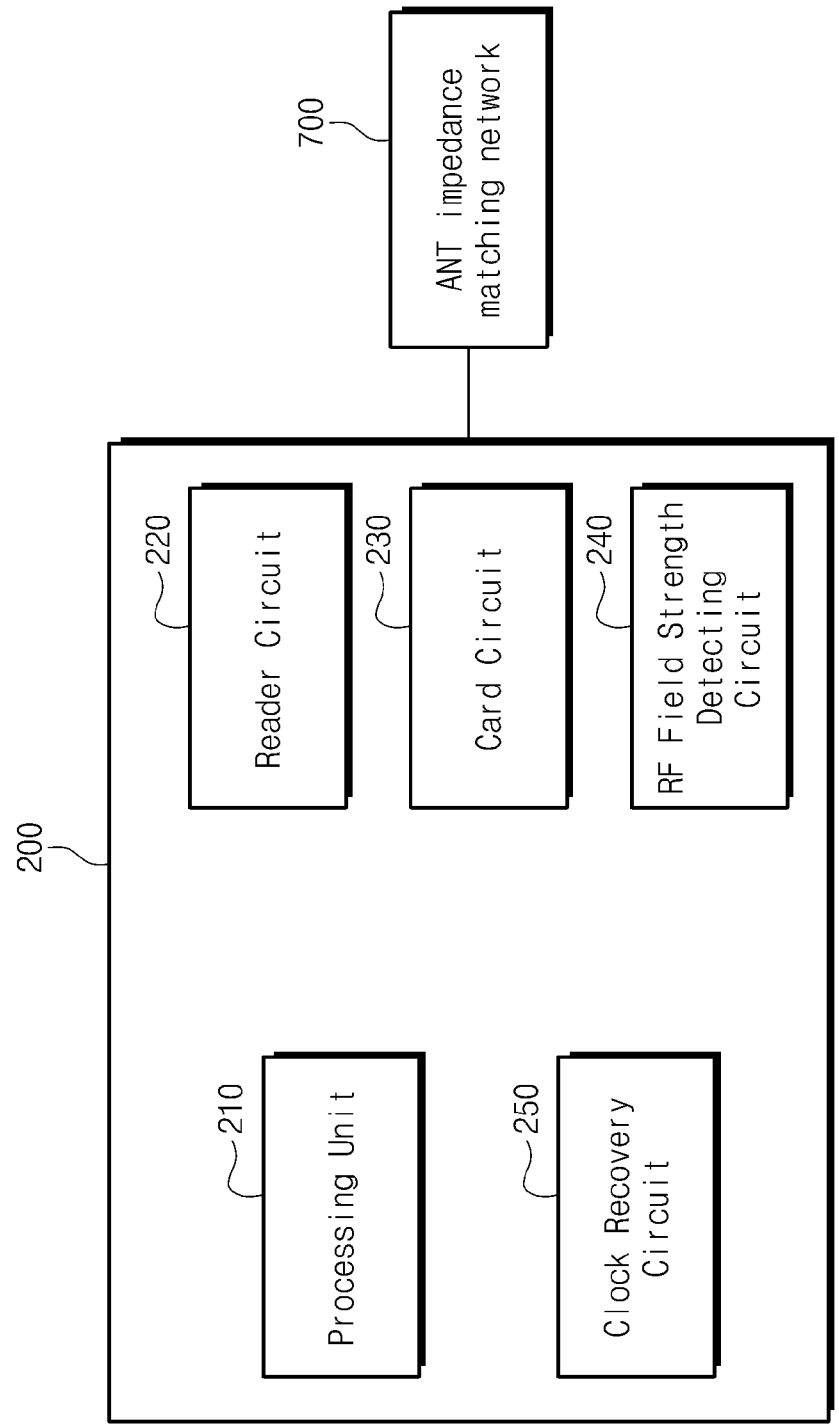
FIG. 2 is a block diagram schematically illustrating an NFC transceiver according to an exemplary embodiment.

FIG. 2 is a block diagram schematically illustrating an NFC transceiver according to one exemplary embodiment.

Referring to FIG. 2, the exemplary NFC transceiver 200 as a contactless communication device includes a processing unit 210 (e.g., a CPU), a reader circuit 220, a card circuit 230, an RF field strength detecting circuit 240, and a clock recovery circuit 250. The NFC transceiver 200 may be connected to an antenna impedance matching network 700, and may receive and transmit signals via the antenna impedance matching network 700.

In one embodiment, the processing unit 210 is configured to control an overall operation of the NFC transceiver 200. The processing unit 210 may include, for example processing circuitry configured to process data received by antenna impedance matching network 700 and to control aspects of the other circuits in the NFC transceiver 200. For example, at a reader mode, the processing unit 210 may activate the reader circuit 220 and inactivate the card circuit 230. For example, activating a circuit may refer to providing power to the circuit, or closing a switch that allows signals to be received and/or transmitted by the circuit. Deactivating the circuit may refer to the opposite (e.g., removing power from the circuit or opening a switch). In this case, the reader circuit 220 may receive and transmit signals via the antenna impedance matching network 700 under a control of the processing unit 210. At a card mode, the processing unit 210 may activate the card circuit 230. Furthermore, at the card mode, the processing unit 210 may selectively activate the reader circuit 220 and the card circuit 230. For example, during a reception interval of the card mode, the processing unit 210 may activate the card circuit 230 to demodulate a signal received via the antenna impedance matching network 700. At this time, the reader circuit 220 may be inactivated under a control of the processing unit 210. During a transmission interval of the card mode, the processing unit 210 may activate the reader circuit 220 to modulate a signal to be transmitted via the antenna impedance matching network 700. At this time, the card circuit 230 may be inactivated under a control of the processing unit 210. As such, in one embodiment such as described above, during the reception interval of the card mode, the card circuit 230 may operate to receive and process signals based on power provided by an RF field supplied by a device external to the NFC transceiver 200, and during the transmission interval of the card mode, the reader circuit 220 operates to process and/or transmit signals based on power provided by the NFC transceiver 200 or a device (e.g., cell phone) to which the NFC transceiver 200 is physically connected.

In example embodiments, the card circuit 230 is activated during the reception interval of the card mode, and may demodulate a signal received via the antenna impedance matching network 700. Furthermore, the reader circuit 220 is activated during the transmission interval of the card mode, and may modulate a signal to be transmitted via the antenna impedance matching network 700.

In other example embodiments, the card circuit 230 may demodulate a signal received via the antenna impedance matching network 700 during the reception interval of the card mode. The card circuit 230 may additionally modulate a signal to be transmitted via the antenna impedance matching network 700 during the transmission interval of the card mode. As such, the card circuit 230 can be selectively controlled either to be active both for reception and transmission in the card mode, or to be active only for reception in the card mode and to be inactive during transmission in the card mode.

In one embodiment, the reader circuit 220 may operate in response to a control of the processing unit 210, and may receive or transmit a signal through the antenna impedance matching network 700 at the reader mode. The card circuit 230 may operate in response to a control of the processing unit 210, and may demodulate a signal received via the antenna impedance matching network 700 during a reception interval of the card mode. The RF field strength detecting circuit 240 may detect the strength of an RF field received via the antenna impedance matching network 700 and provide the detection result to the processing unit 210. The RF field strength detecting circuit 240 may detect the strength of the RF field via ADC (analog to digital converter) monitoring of a voltage of an antenna. However, a detection technique of the RF field strength detecting circuit 240 is not limited to this disclosure. For example, the strength of the RF field may be detected using a charging and discharging time of a current flowing via the antenna, an internal source formed within the NFC transceiver 200, etc.

In one embodiment, the processing unit 210 controls an output power (or, a driving capacity) of the reader circuit 220 during a transmission interval of the card mode according to the detection result provided from the RF field strength detecting circuit 240. The output power of the reader circuit 220 may be adjusted by the processing unit 210 during the transmission interval of the card mode. Alternatively, the output power of the reader circuit 220 may be adjusted by the processing unit 210 before the transmission interval of the card mode. Or, the output power of the reader circuit 220 may be adjusted by the processing unit 210 during the reception interval of the card mode. In one embodiment, a processing interval of the processing unit 210, and the output power thus adjusted, may be maintained until a communication interval is terminated. Alternatively, in another embodiment, the output power thus adjusted may be again adjusted by the processing unit 210 according to a field strength detected.

The clock recovery circuit 250 may generate a clock signal (e.g., a clock signal having a frequency of about 13.56 MHz) based on a carrier of an RF field induced at the antenna impedance matching network 700. The clock signal generated by the clock recovery circuit 250 may be used, for example, to modulate data to be transmitted via the antenna impedance matching network 700. This will be more fully described later. In one embodiment, coarse tuning on a frequency of the clock signal generated by the clock recovery circuit 250 may be performed during an operating interval of the processing unit 210 between the reception interval and the transmission interval of the card mode. In one embodiment, fine tuning on a frequency of the clock signal generated by the clock recovery circuit 250 may be performed in the transmission interval of the card mode. Noise immunity of the clock signal may be improved by securing a bandwidth through such a tuning technique.

As understood from the above description, a signal received during the reception interval of the card mode may be demodulated by the card circuit 230, and a signal to be transmitted during the transmission interval of the card mode may be modulated by the reader circuit 220. Constant load modulation amplitude may be secured regardless of the field strength by modulating a signal to be transmitted during the transmission interval of the card mode using a chip power (e.g., power received from a device to which the transceiver 200 is physically connected). Also, the strength of a signal to be transmitted during the transmission interval of the card mode may be adjusted according to the strength of the RF field detected by the RF field strength detecting circuit 240. Furthermore, a clock signal for modulation may be generated based on a carrier of the RF field induced, so that the burden of the clock recovery circuit 250 is reduced and noise immunity is improved.

Figure 3A:
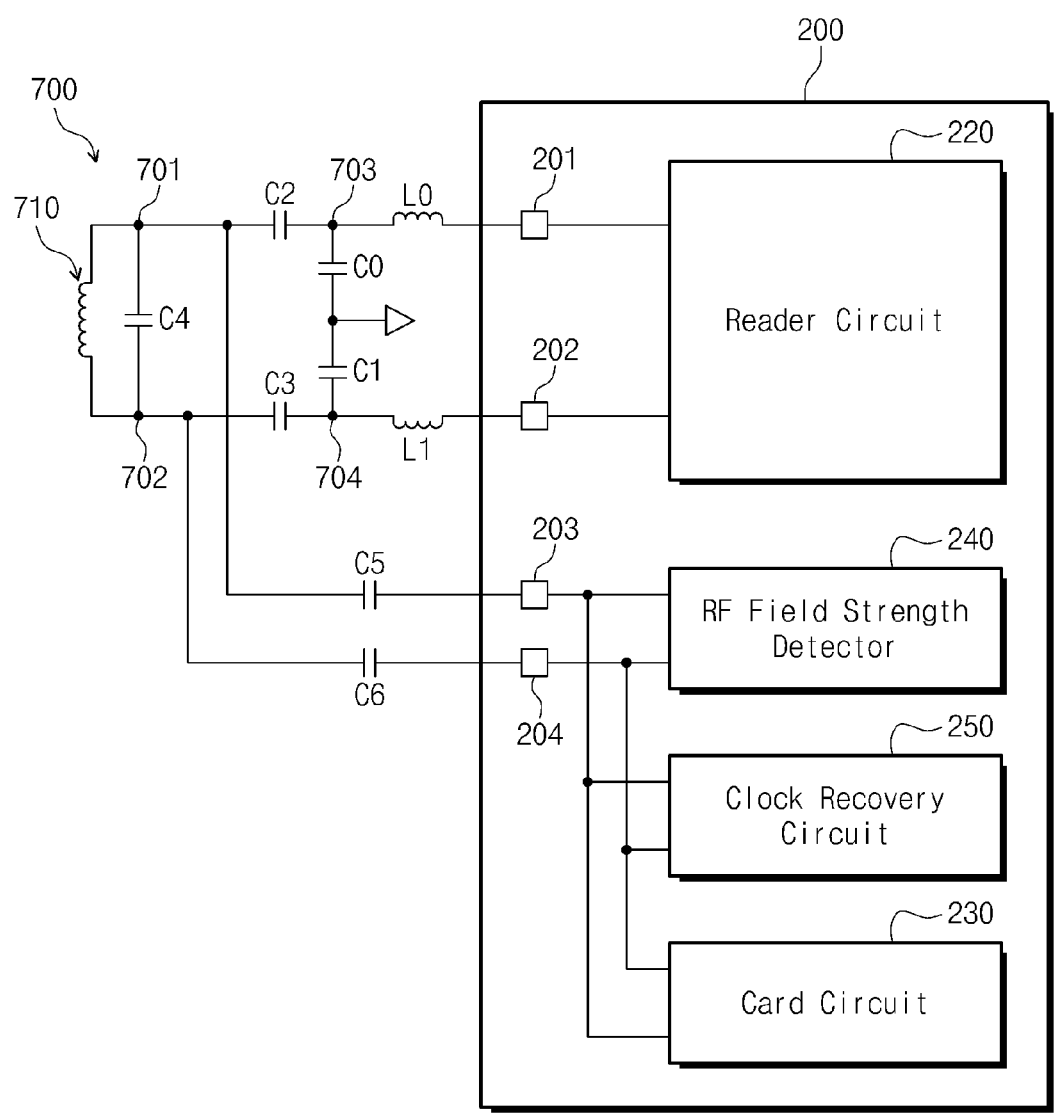
FIG. 3A is a diagram schematically illustrating an antenna impedance matching network and an NFC transceiver according to one exemplary embodiment.

FIG. 3A is a diagram schematically illustrating an antenna impedance matching network and an NFC transceiver according to one exemplary embodiment.

Referring to FIG. 3A, an antenna impedance matching network 700 according to one exemplary embodiment includes inductors L0 and L1, capacitors C0 to C6, and an antenna 710. The antenna impedance matching network 700 may be connected to a reader circuit 220 of an NFC transceiver 200 via chip terminals 201 and 202, and may be connected, for example, to a card circuit 230, an RF field strength detecting circuit 240, and a clock recovery circuit 250 of the NFC transceiver 200 via chip terminals 203 and 204. As shown in FIG. 2, an NFC transceiver 200 according to one embodiment may also include a processing unit 210. However, such inclusion is not required as a processing unit may be located elsewhere.

The inductors L0 and L1 and the capacitors C0 and C1 may constitute a filter (e.g., an EMC filter) to remove a harmonic wave of an NFC signal output from the reader circuit 220. Also, as an impedance matching circuit, the inductors L0 and L1 and the capacitors C0 and C1 may be used to tune impedance matching, bandwidth, Q factor, etc.

Referring to FIG. 3A, the inductor L0 and the capacitor C2 may be connected in series between the chip terminal 201 and an antenna node 701, and the capacitor C0 may be connected between a connection node 703 of the inductor L0 and the capacitor C2 and a reference potential (e.g., a ground voltage). The inductor L1 and the capacitor C3 may be connected in series between the chip terminal 202 and an antenna node 702, and the capacitor C1 may be connected between a connection node 704 of the inductor L1 and the capacitor C3 and a reference potential (e.g., a ground voltage). The capacitor C4 and the antenna 710 may be connected in parallel between the antenna nodes 701 and 702. The antenna 710 may be formed, for example, of a conductive line having a spiral shape. The capacitor C5 may be connected between a chip terminal 203 and the antenna node 701, and the capacitor C6 may be connected between a chip terminal 204 and the antenna node 702.

In example embodiments, as illustrated in FIG. 3A, the card circuit 230, the RF field strength detecting circuit 240 and the clock recovery circuit 250 are connected in common to the chip terminals 203 and 204. However, a structure of the antenna impedance matching network 700 is not limited to this disclosure.

Figure 3B:
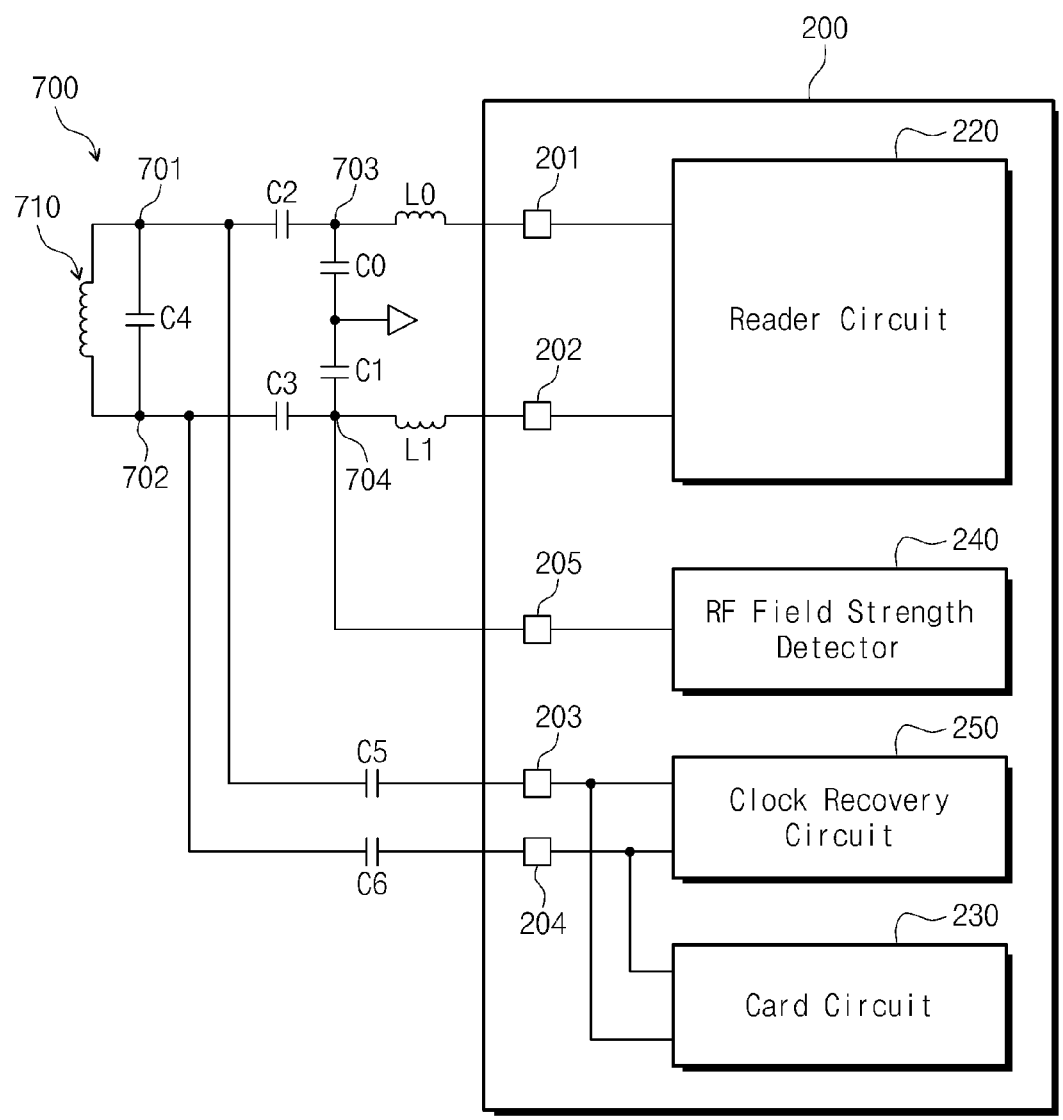
FIG. 3B is a diagram schematically illustrating an antenna impedance matching network and an NFC transceiver according to another exemplary embodiment.

FIG. 3B is a diagram schematically illustrating an antenna impedance matching network and an NFC transceiver according to another exemplary embodiment.

An NFC transceiver 200 of FIG. 3B may be substantially the same as that illustrated in FIG. 3A except that an RF field strength detecting circuit 240 is connected to an antenna impedance matching network 700 via a separate chip terminal 205 connected to connection node 704. A more detailed description of the remaining elements of FIG. 3B is thus omitted.

Although example embodiments are described in FIGS. 3A and 3B, the connection between the RF field strength detecting circuit 240 and the antenna impedance matching network 700 are not limited to those illustrated in FIGS. 3A and 3B.

Figure 4:
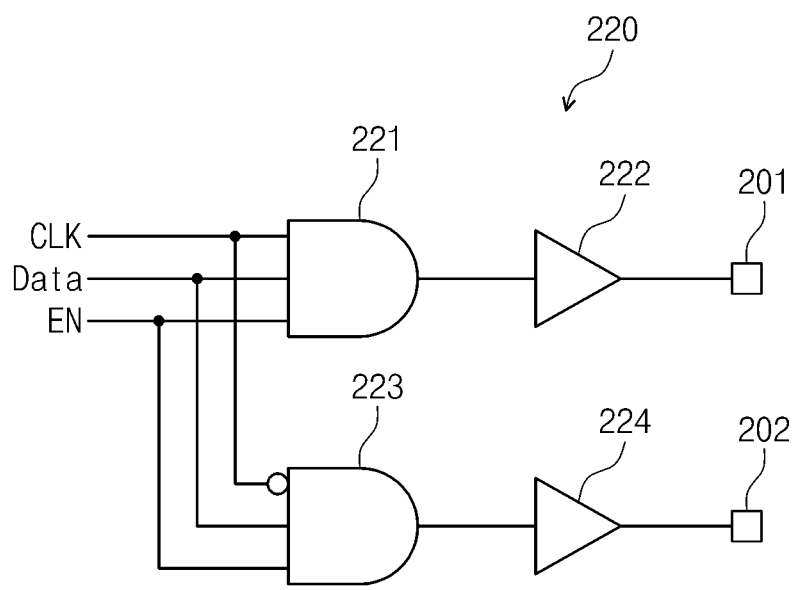
FIG. 4 is a diagram schematically illustrating a part of a read circuit according to an exemplary embodiment.

FIG. 4 is a diagram schematically illustrating a part of a read circuit according to one exemplary embodiment.

A reader circuit 220 according to one embodiment, although not shown, may include a transmitter and a receiver. In FIG. 4, there is illustrated a part of the transmitter of the read circuit 220. The reader circuit 220 may include AND gates 221 and 223 and output drivers 222 and 224. Data to be transmitted, a clock signal CLK and a control signal EN may be provided to the AND gates 221 and 223. The data and the control signal EN may be provided, for example, from a processing unit 210, and the clock signal CLK may be provided, for example, from a clock recovery circuit 250 during a transmission interval of a card mode. A chip terminal 201 may be driven by the output driver 222 and the AND gate 221 during a half period of the clock signal CLK, and a chip terminal 202 may be driven by the output driver 224 and the AND gate 223 during the remaining half period of the clock signal CLK. In one embodiment, at a reader mode, the clock signal CLK provided to the AND gates 221 and 223 may be provided from a clock generator (not shown) of an NFC transceiver 200. As described above, output powers of the output drivers 222 and 224 may be adjusted by the processing unit 210 according to the field strength detected.

In one embodiment, during a reception interval of the card mode, the processing unit 210 outputs the control signal EN having a logically '0' value. In this case, the data and clock signal CLK are not transferred to the output drivers 222 and 224 via the AND gates 221 and 223. During a transmission interval of the card mode, however, the processing unit 210 may output the control signal EN having a logically '1' value. In this case, the data and clock signal CLK may be transferred to the output drivers 222 and 224 via the AND gates 221 and 223. As shown in the embodiment of FIG. 4, the output drivers 222 and 224 may alternately drive the chip terminals 201 and 202 according to a combination of the data and the clock signal CLK. As the chip terminals 201 and 202 are alternately driven by the output drivers 222 and 224, load modulation on data to be transmitted may be performed. As such, active load modulation may be performed.

Though a specific example of a transmitter for a reader circuit 220 is shown in FIG. 4, a transmitter of the reader circuit 220 is not limited to the specific configuration shown in FIG. 4, and may have other configurations.

Figure 5:
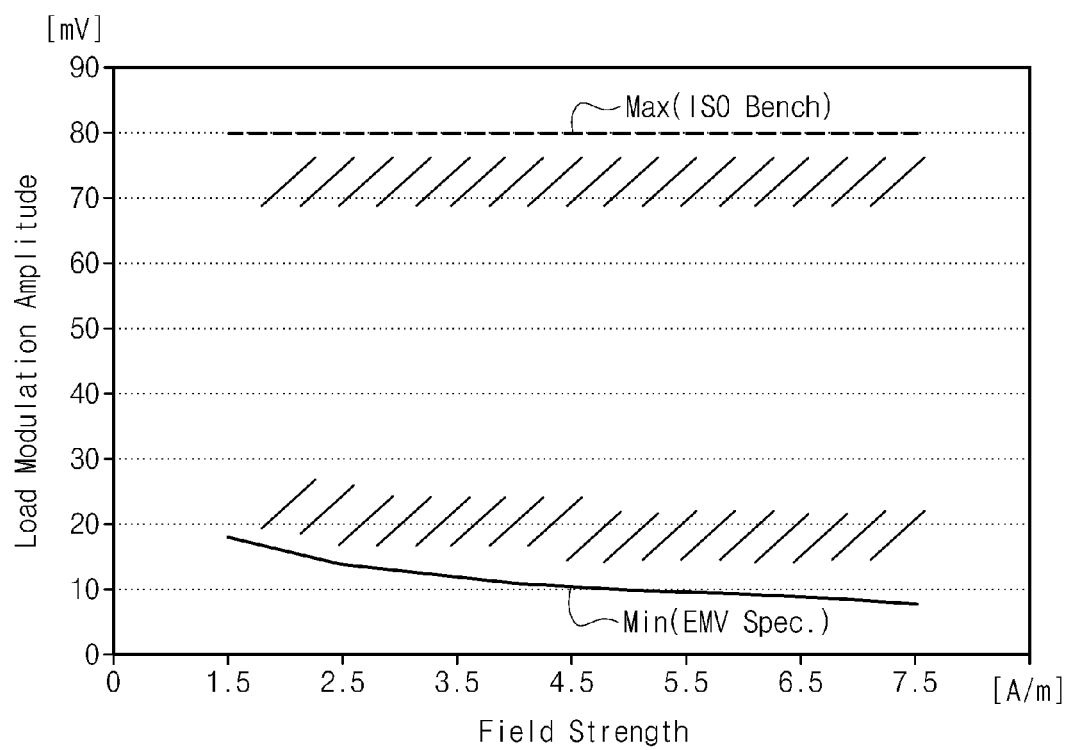
FIG. 5 is a diagram showing an exemplary relation between load modulation amplitude and field strength.

FIG. 5 is a diagram showing an exemplary relation between load modulation amplitude and field strength.

In the example shown in FIG. 5, a minimum value Min of load modulation amplitude according to field strength is defined by the ISO 1443 standard, and a maximum value Max thereof is defined by the EMV standard. In the event that an output power (or, a driving capacity) of an output driver 222 in a reader circuit 220 is fixed to a particular level regardless of the field strength, a power may be unnecessarily consumed or the load modulation power may exceed the maximum value Max due to an excessive output power. For example, in the event that the load modulation amplitude is 10 mV, communication may be performed normally when the field strength is at least as high as a particular threshold (e.g., 6.5 A/m). However, if the field strength is lower than the threshold, a communication fail may occur. In the event that the load modulation amplitude is larger than 20 mV, communication may be normally made regardless of the field strength. However, a power may be unnecessarily consumed.

In the disclosed embodiments, an RF field strength detecting circuit 240 may detect the strength of the RF field induced and provide a processing unit 210 with information on the field strength detected. The processing unit 210 may control output powers (or, driving capacities) of output drivers 222 and 224 of the reader circuit 220. The output powers (or, driving capacities) of output drivers 222 and 224 may be adjusted in various methods. For example, the reader circuit 220 may be configured to include output driver pairs having different driving capacities, and the processing unit 210 may control the output powers (or, driving capacities) of the output drivers 222 and 224 of the reader circuit 220 by selecting a pair of output drivers, corresponding to the field strength detected, from among output driver pairs having different driving capacities. Or, the output powers (or, driving capacities) of the output drivers 222 and 224 of the reader circuit 220 may be controlled by adjusting pull-up/pull-down transistors of respective output drivers turned on according to the field strength detected. However, a method of adjusting the output powers (or, driving capacities) of the output drivers 222 and 224 of the reader circuit 220 is not limited to these examples. Thus, it is possible to adjust the load modulation amplitude actively according to the strength of the RF field.

In example embodiments, the processing unit 210 may control an output power (or, a driving capacity) of the reader circuit 220 during a transmission interval of a card mode. Alternatively, the output power of the reader circuit 220 may be adjusted by the processing unit 210 before the transmission interval of the card mode. Or, the output power of the reader circuit 220 may be adjusted by the processing unit 210 during the reception interval of the card mode and a processing interval of the processing unit 210. The output power thus adjusted may be maintained until a communication interval is terminated, or alternatively, may be again adjusted by the processing unit 210 according to field strength detected.

Figure 6:
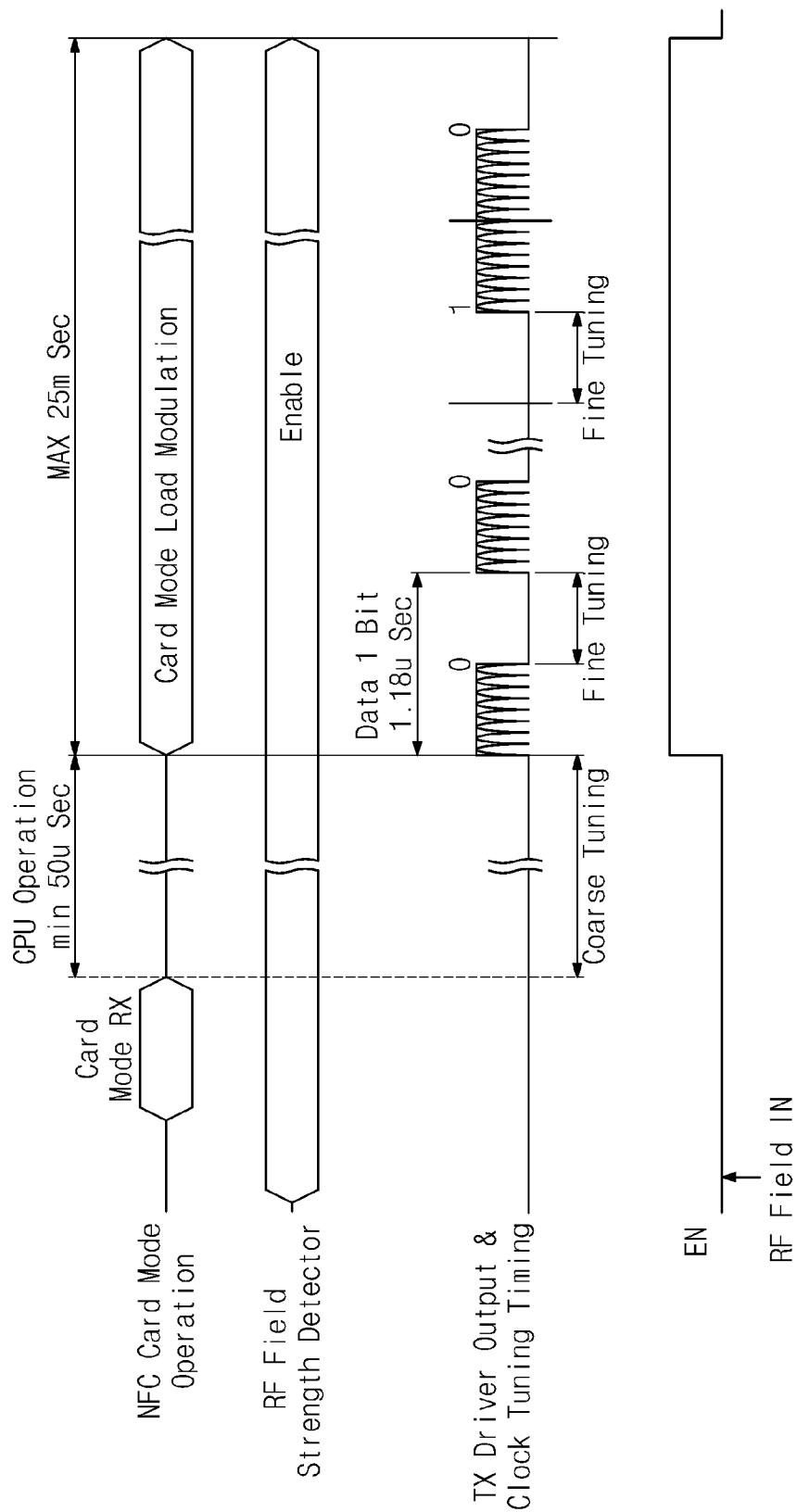
FIG. 6 is a timing diagram schematically illustrating an operation of an NFC transceiver, according to one exemplary embodiment.

FIG. 6 is a timing diagram schematically illustrating an operation of an NFC transceiver according to one exemplary embodiment. Below, an exemplary operation of an NFC transceiver will be more fully described with reference to accompanying drawings.

In one exemplary embodiment, it is assumed that an NFC transceiver 200 is set to a card mode. With this assumption, a reader circuit 220 and a card circuit 230 may operate selectively according to a control of a processing unit 210. If the NFC transceiver 200 is set to a reader mode, the reader circuit 220 may be activated by the processing unit 210 to receive and transmit signals via an antenna impedance matching network 700. At that time, the card circuit 230 may be inactivated by the processing unit 210.

In one embodiment, an RF field strength detecting circuit 240 may detect the strength of an RF field induced. In the event that the NFC transceiver 200 is set to the card mode, the RF field strength detecting circuit 240 may detect whether the RF field is induced. If the RF field is induced, the RF field strength detecting circuit 240 may provide the processing unit 210 with the detection result as wake-up information.

Afterwards, the card circuit 230 may restore information received via the antenna impedance matching network 700 and provide the restored information to the processing unit 210. The processing unit 210 may process data provided from the card circuit 230 during a predetermined time. While data is processed by the processing unit 210, a clock recovery circuit 250 may generate a clock signal CLK based on a carrier of the RF field induced. At this time, coarse tuning on a frequency of the clock signal CLK may be made.

The reader circuit 220 may be inactivated by the processing unit 210 from a point of time when the RF field is induced until a point of time when a data processing operation of the processing unit 210 is completed. For example, the reader circuit 220 may be inactivated before a transmission interval of the card mode starts. This may be made, in one embodiment, via a control signal EN as described above.

If a data processing operation of the processing unit 210 is completed, for example, at the transmission interval of the card mode, the processing unit 210 may activate the control signal EN such that the reader circuit 220 is activated. At this time, data processed by the processing unit 210 may be sent to the reader circuit 220 with the control signal EN. As the control signal EN is activated, a transmitter of the reader circuit 220, for example, output drivers 222 and 224 may alternately drive chip terminals 201 and 202 according to a combination of data and the clock signal CLK. As such, load modulation may be carried out. As the load modulation is made by the output drivers 222 and 224 of the reader circuit 220, load modulation amplitude may be stably maintained according to the strength of the RF field without unnecessary power consumption. As illustrated in FIG. 6, in one exemplary embodiment, fine tuning on the frequency of the clock signal CLK may be made during a low-level interval of 1-bit data.

In one exemplary embodiment, the card circuit 230 may be configured to perform a demodulation function without a modulation function. For example, the card circuit 230 may not include a resistor/capacitor load modulator. In this case, the card circuit 230 may only perform a demodulation function.

In other example embodiments, the card circuit 230 may be configured to include a resistor/capacitor load modulator. In one embodiment, the resistor/capacitor load modulator may be always inactivated by the processing unit. However, the card circuit 230 may be configured to perform both the demodulation function and the modulation function. This will be more fully described below.

Figure 7:
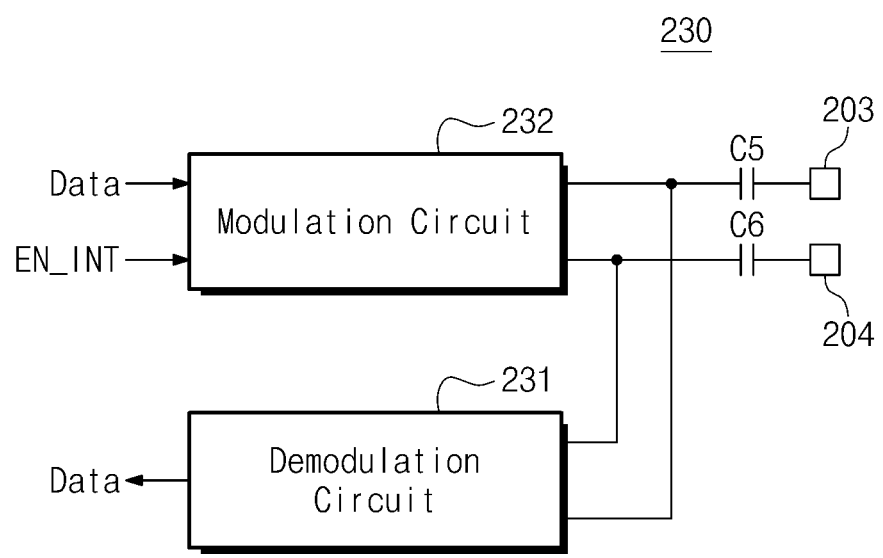
FIG. 7 is a block diagram schematically illustrating a card circuit according to one exemplary embodiment.

FIG. 7 is a block diagram schematically illustrating a card circuit according to one exemplary embodiment.

Referring to FIG. 7, a card circuit 230 may include a demodulation circuit 231 and a modulation circuit 232. The demodulation circuit 231 and the modulation circuit 232 may be connected to chip terminals 203 and 204 via capacitors C5 and C6. The demodulation circuit 231 may demodulate a signal received via an antenna impedance matching network 700 and output the demodulated result to a processing unit 210. The modulation circuit 232 may be, for example, a well-known resistor/capacitor load modulator formed of a resistor/capacitor and a switching transistor connected in series between the chip terminal 203/204 and a reference potential. The modulation circuit 232 is not limited to a resistor/capacitor load modulator with a specific structure.

In one embodiment, the modulation circuit 232 receives data and a control signal EN_INT from the processing unit 210 and perform load modulation based on data applied to a gate of a switching transistor according to the control signal EN_INT. Here, the control signal EN_INT may be activated by the processing unit 210 when a specific condition is satisfied. For example, it is assumed that load modulation is performed in a manner described with reference to FIGS. 2 to 6. Under this assumption, if a communication error is generated at load modulation performed according to a manner described with reference to FIGS. 2 to 6, the processing unit 210 may activate the control signal EN_INT at a next communication. In this case, data modulation and demodulation of the card mode may be performed by the card circuit 230. At this time, a transmitter of a reader circuit 220 may be inactivated. As a result, data modulation and demodulation of the card mode may be performed by a transmitter of the reader circuit 220 or by the modulation circuit 232 of the card circuit 230 according to a specific condition.

In accordance with the disclosed embodiments, load modulation amplitude may be adjusted by performing load modulation of the card mode using an output driver unit of the reader circuit 220 of an NFC transceiver 200. As described above, first, demodulation in a reception interval being a basic operation of the card mode may be performed by the card circuit 230. After demodulation and an operation of CPU (e.g., processing unit 210) are completed, a transmission operation of the card mode may be performed using an output driver unit of the reader circuit 220. In this embodiment, load modulation is not performed by the card circuit 230 in a transmission interval of the card mode. A signal generated by a transmitter at load modulation using an output driver may include a signal frequency and a carrier frequency.

While the present disclosure has been described with reference to exemplary embodiments, it will be apparent to those skilled in the art that various changes and modifications may be made without departing from the spirit and scope of the present invention. Therefore, it should be understood that the above embodiments are not limiting, but are illustrative.

What is claimed is:

1. A contactless communication device, comprising:
   a field strength detecting circuit configured to detect a strength of a field induced on an antenna;
   a card circuit configured to demodulate a signal received via the antenna during a reception interval of a card mode;
   a processing unit configured to process the demodulated signal; and
   a reader circuit configured to transmit modulated data via the antenna during a transmission interval of the card mode, the modulated data being modulated from data provided from the processing unit after processing the demodulated signal,
   wherein the device is configured to adjust an output power of the reader circuit according to the field strength detected.

2. The contactless communication device of claim 1, wherein the transmitted modulated data is responsive to the received signal.

3. The contactless communication device of claim 1, wherein the device is configured to adjust the output power of the reader circuit according to the field strength detected before the transmission interval of the card mode, and to maintain the adjusted output power during the transmission interval of the card mode.

4. The contactless communication device of claim 1, wherein the output power of the reader circuit is adjusted according to the field strength detected before the transmission interval of the card mode, and the adjusted output power is adjusted according to the field strength detected during the transmission interval of the card mode.

5. The contactless communication device of claim 1, further comprising:
   a clock recovery circuit configured to generate a clock signal based on a carrier of a field induced on the antenna.

6. The contactless communication device of claim 5, wherein the clock recovery circuit is configured to perform a course tuning on a frequency of the clock signal during an operating interval of the processing unit, and to perform a fine tuning on the frequency of the clock signal during the transmission interval of the card mode.

7. The contactless communication device of claim 5, wherein the device is further configured to supply the clock signal to the reader circuit with the data during the transmission interval of the card mode, and the reader circuit is configured to drive the antenna with the adjusted output power in response to the clock signal and the data.

8. The contactless communication device of claim 1, wherein the card circuit does not provide a modulation function.

9. The contactless communication device of claim 1, wherein the card circuit provides a modulation function and a demodulation function.

10. The contactless communication device of claim 9, wherein the processing unit is configured to activate the modulation function of the card circuit when communication using the reader circuit has failed.

11. A user device, comprising:
    an NFC transceiver; and
    an antenna impedance matching network connected to the NFC transceiver,
    wherein the NFC transceiver comprises:
    a field strength detecting circuit configured to detect a strength of a field induced on an antenna of the antenna impedance matching network;
    a first circuit powered by an external signal, the first circuit configured to demodulate a signal received via the antenna during a reception interval of a card mode;
    a processing unit configured to process the demodulated signal; and
    a second circuit powered by the user device, the second circuit configured to transmit data provided from the processing unit via the antenna during a transmission interval of the card mode,
    wherein the user device is configured to adjust an output power of the second circuit according to the field strength detected.

12. The user device of claim 11, wherein the user device is configured to adjust the output power of the second circuit according to the field strength detected before the transmission interval of the card mode, and to maintain the adjusted output power during the transmission interval of the card mode.

13. The user device of claim 11, wherein the user device is configured to adjust the output power of the second circuit according to the field strength detected before the transmission interval of the card mode, and to further adjust the adjusted output power according to the field strength detected during the transmission interval of the card mode.

14. The user device of claim 11, wherein the user device is configured to adjust the output power of the second circuit according to the field strength detected during the transmission interval of the card mode.

15. The user device of claim 11, wherein the NFC transceiver further comprises a clock recovery circuit configured to generate a clock signal based on a carrier of a field induced on the antenna.

16. The user device of claim 15, wherein the clock recovery circuit is configured to perform a coarse tuning on a frequency of the clock signal during an operating interval of the processing unit and perform a fine tuning on the frequency of the clock signal during the transmission interval of the card mode.

17. The user device of claim 15, wherein the user device is further configured to supply the clock signal to the second circuit with the data during the transmission interval of the card mode, and the second circuit is configured to drive the antenna with the adjusted output power in response to the clock signal and the data.

18. An operating method of a contactless communication device which includes a reader circuit and a card circuit connected to an antenna impedance matching network, the method comprising:
   detecting a strength of a field induced on an antenna;
   demodulating a signal received via the antenna;
   processing the demodulated signal; and
   modulating the processed signal,
   wherein the demodulating is performed via the card circuit, the modulating is performed via the reader circuit, and an output power of the reader circuit is adjusted according to the detected field strength.

19. The operating method of claim 18, further comprising:
   generating a clock signal based on a carrier of a field induced on the antenna;
   using the clock signal for modulation of the processed signal; and
   performing coarse tuning of the clock signal during a processing interval of the demodulated signal; and
   performing fine tuning of the clock signal during a transmission interval of a card mode.

20. The operating method of claim 18, wherein an output power of the reader circuit is adjusted according to the field strength detected before a transmission interval of a card mode, and the adjusted output power is maintained in the transmission interval of the card mode or is further adjusted according to the field strength detected in the transmission interval of the card mode.

21. A near field communication device, comprising:
   a receiving circuit configured to receive and demodulate a first signal received at an antenna of the near field communication device from outside the near field communication device; and
   a transmitting circuit configured to modulate and transmit a second signal from the near field communication device, in response to the first signal, wherein:
   the near field communication device is configured to detect a field strength of the first signal, and to control an output power for the second signal based on the detected field strength.

22. The near field communication device of claim 21, further comprising:
   a processor configured to control the output power for the second signal.

23. The near field communication device of claim 22, further comprising:
   at least a first output driver, wherein the processor is configured to control the output power of the first output driver based on the detected field strength.

24. The near field communication device of claim 23, further comprising:
   at least a second output driver, wherein the processor is configured to control the output power of the first output driver and the second output driver based on the detected field strength.

25. The near field communication device of claim 24, further configured to:
   modulate load by alternatively driving first and second chip terminals respectively connected to the first and second output drivers.

26. The near field communication device of claim 21, further comprising:
   a processor configured to:
   activate the receiving circuit and deactivate the transmitting circuit during a reception interval; and
   activate the transmitting circuit and deactivate the receiving circuit during a transmission interval that follows the reception interval.

27. The near field communication device of claim 26, wherein:
   the processor is further configured to adjust the output power for the transmitting circuit prior to the transmission interval.

28. A method of performing near field communications, the method comprising:
   receiving and demodulating a first signal received at an antenna of a device;
   detecting a strength of an RF field at the antenna;
   processing the demodulated signal;
   modulating the processed signal; and
   transmitting from the device a second signal that reflects the modulated processed signal, wherein:
   an output power for the second signal is adjusted according to the detected field strength.

29. The method of claim 28, wherein:
   demodulating the first signal is performed by a card circuit of the device; and
   modulating the first signal is performed by a reader circuit of the device.

30. The method of claim 29, further comprising:
   activating the card circuit and deactivating the reader circuit during a reception interval; and
   deactivating the card circuit and activating the reader circuit during a transmission interval that follows the reception interval.

* * * * *